United States Patent [19]

Kallaes et al.

[11] 4,249,840
[45] Feb. 10, 1981

[54] LASHING ROD

[75] Inventors: Elis Kallaes; Karl-Erik Starell, both of Orsa, Sweden

[73] Assignee: Orsa Kattingfabrik AB, Orsa, Sweden

[21] Appl. No.: 4,156

[22] Filed: Jan. 17, 1979

[30] Foreign Application Priority Data

Jan. 20, 1978 [SE] Sweden ............................. 7800735

[51] Int. Cl.³ ................. F64B 17/00; B61D 17/00; A65B 35/00
[52] U.S. Cl. ................................... 410/81; 410/76
[58] Field of Search ............... 105/463; 410/76, 77, 410/81, 82, 84; 24/81 E; 206/512, 821

[56] References Cited

U.S. PATENT DOCUMENTS

| | | | |
|---|---|---|---|
| 3,116,702 | 1/1964 | Stough | 105/463 |
| 3,125,965 | 3/1964 | De Penti et al. | 410/76 |
| 3,556,456 | 1/1971 | Lunde | 410/84 |
| 3,734,442 | 5/1973 | Lunde | 410/77 |
| 4,082,240 | 4/1978 | Heathman et al. | 105/463 |

*Primary Examiner*—Richard A. Bertsch
*Attorney, Agent, or Firm*—Christie, Parker & Hale

[57] ABSTRACT

A lashing rod for lashing vertically stacked containers. The containers have hollow corner castings and the lashing rod has a head comprising a stud adapted for passage through a side access opening of the casting. The locking head is securable to the casting by rotating the head about a pivotal axis so that the stud engages an inner wall of the casting. A fitting, having a locking pin receiving bore, partially extends into a corner casting and is adapted for interconnecting two abutting stacked containers. The locking head has a locking pin adapted for insertion into the bore upon passage of the stud into the side access opening so that the locking head is rotatable for securing the locking head to the casting while the pin is inserted in the bore.

8 Claims, 3 Drawing Figures

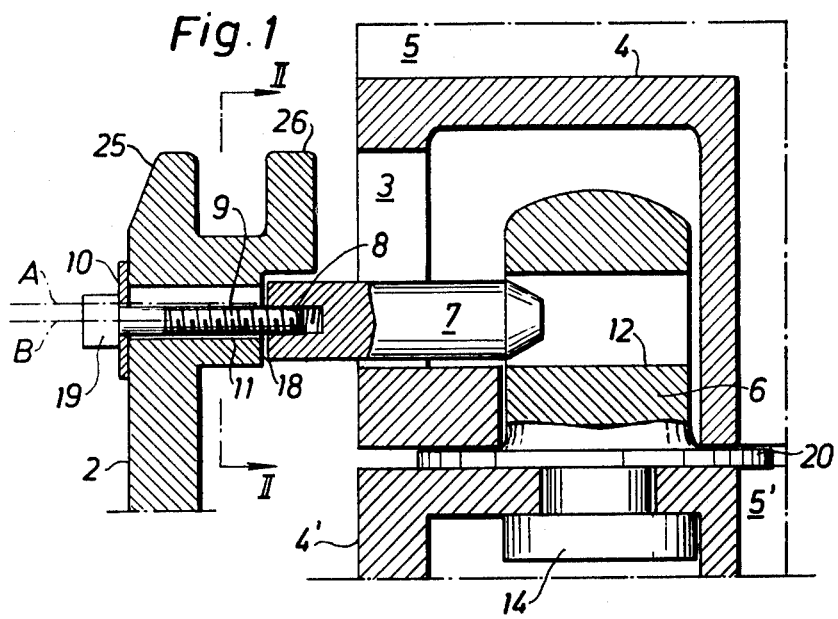
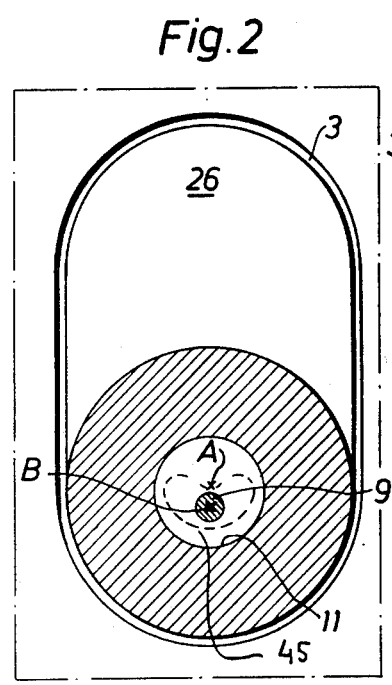
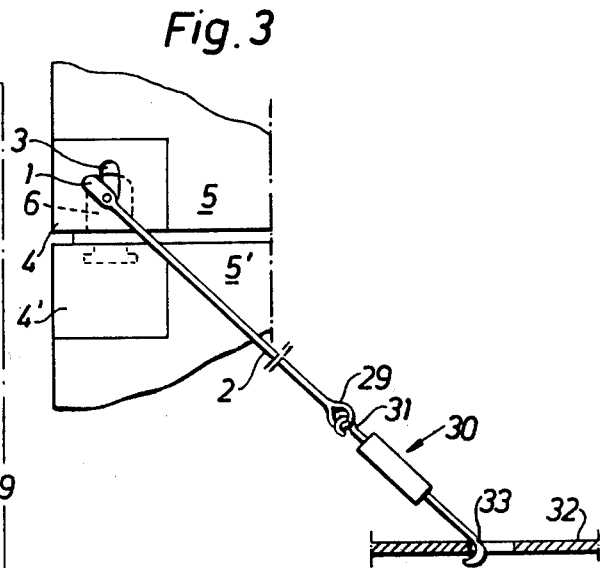

LASHING ROD

BACKGROUND OF THE INVENTION

The invention refers to a lashing rod having a locking head for connection to a corner casting on a container by way of a side access opening corresponding to the locking head, in the corner casting, a fitting being inserted into the cavity of the corner casting by way of a bottom access opening in the corner casting, said fitting being arranged lockable at the corner casting by means of a locking pin which in mounted condition lies in parallel with but eccentrically relative to the rotational axis of the locking head in the side access opening.

During transport containers need normally be lashed. To this end containers normally have a so called corner casting to which lashings may be connected. When containers are stacked, a fitting is mounted between vertically adjacent corner castings. The fitting may be coupled to the lower corner casting by means of a bayonet coupling for example.

Such fittings serve to protect mutual horizontal displacement of stacked containers. In order to prevent the overlying container to move vertically there are two possibilities. One possibility is to let the upper part of the fitting be provided with a bore which faces a side access opening in the wall of the corner casting. A locking pin may then be inserted into the bore of the fitting whereby the end of the locking pin will rest on the bottom wall of the corner casting. Hereby the overlying container is vertically fixed relative to the underlying container (or a support base). The other possibility is to utilize a lashing rod having a locking head. The locking head has a locking stud which may be brought to grip behind the opening edge of the corner casting by pivoting the lashing rod (and thereby the locking head), whereafter the lashing rod is connected to the support base (the deck of a ship for example). The latter method offers the advantage that the underlying container (s) may be stabilized such that the underlying container (s) does not become "sheared" under influence of the weight of overlying containers in the container stack.

A drawback relating to the first mentioned method is that a lashing cannot be attached where a locking rod is used. Moreover experience has demonstrated the difficulties of attaching and releasing respectively locking pins which often are mounted on a substantial height over the support base. Furthermore, experience has shown that locking pins are easily forgotten when the containers are to be unloaded, and this leads in turn to damages to the cranes and other equipment utilized to lift the containers, and to the the containers themselves.

A drawback relating to the second method is that a locking pin cannot be used when a lashing rod is utilized.

An object with the invention is therefore to provide a device by means of which the above mentioned drawbacks are avoided.

The prior art relating to the above container lashing technique comprises the U.S. Pat. Nos. 3,125,965, 3,556,456 and 3,734,442 which reveal how containers are mutually locked by means of fittings and locking rods. Swedish Pat. Nos. 376,739 and 380,502 reveal how a locking head on a lashing rod or the like are connected to a container corner casting by pivoting the locking head in the side access opening of the corner casting whereby a locking stud on the locking head grips behind the opening edge of the corner casting.

SUMMARY OF THE INVENTION

The object of the invention is reached by means of a lashing rod with a locking head to which a locking pin is connected with the pin axis substantially in parallel with the rotational axis of the locking head in the side access opening of the corner casting, the locking pin being arranged parallel displaceable relative to the locking head axis. Hereby the locking pin may be inserted into the bore of the fitting by means of the lashing rod, and the lashing rod may be pivoted for connection of the locking head thereof to the corner casting without being hindered by the locking pin.

Preferably the inventive lashing rod is designed such that the locking head has a through-going hole extending in parallel with the pivot axis of the locking head, that the locking pin has a coaxial shaft extending through the hole, that the shaft is mounted form-closed at the locking head against axial movement, and that the hole of the locking head is designed with such a play between the shaft and the hole wall that the locking head may be pivoted at least a limited angle in the side access opening of the corner casting without being hindered by the shaft of the locking pin inserted in the fitting.

The lashing rod may have a substantial length, of let us say 2.5 meters, and it is appreciated that an operator now can stand on e.g. the ship deck and lift the lashing rod to insert the locking pin connected to the locking head of the lashing rod through the side access opening of the corner casting and into the fitting, and also insert the locking head of the lashing rod in the side access opening of the corner casting, and then by means of a simple pivoting motion connect the locking head at the side access opening.

As the locking pin is connected to the locking head of the lashing rod the risk of forgetting the locking pin when the container is to be unloaded, is eliminated.

The invention is defined in the appended claims.

BRIEF DESCRIPTION OF THE DRAWINGS

The invention will now be closer described in connection with an exemplary embodiment with reference to the appended drawings.

FIG. 1 is a partial cutaway front elevation view of the lashing rod, according to the hereindescribed invention, for the coupling stacked containers, FIG. 2 is a sectional view (not in proportion) taken along line II—II of FIG. 1, and FIG. 3 is a front elevation view of the lashing rod of FIG. 1 in the mounted condition.

DETAILED DESCRIPTION

FIG. 1 shows a container 5 at the corner of which a corner casting 4 is arranged. The container 5 is stacked onto an underlyng container 5' in the corner of which a corresponding corner casting 4' is arranged. The containers 5, 5' are coupled to each other by means of a fitting 6 which is connectable to the corner castings 4, 4'. The lower portion 14 of the fitting 6 is coupled to the corner casting 4' by means of a bayonet mounting. At the intermediate portion of the fitting there is a flange 20 which serves as a support for the upper container 5. The upper portion of the fitting 6 has hole 12 in which a locking pin 7 can be inserted. When the locking pin 7 is inserted in the hole 12, the corner castings 4, 4' are locked relative to each other also in the vertical direction.

The corner casting 4 has an elongated side access opening 3. A lashing rod 2 is provided with a locking head 1 the shape of which is adapted to the opening 3. The head 1 is arranged turnable around its axis A when it is inserted in the opening 3. The locking head has two studs 25,26 which are arranged to be located on opposite sides of the corner casting hole wherein the opening 3 is arranged. The head 1 also has a through-going hole 11 which extends in parallel with the rotational axis of the head. The locking pin 7 is connected to the head 1 by means of a bolt 9. The bolt 9, the head 19 of which rests against a washer 10 which in turn rests against the body-portion of the head 1, extends through the head hole 11 and is attached to the locking pin 7 by means of a thread joint 8 or the like, the thread joint 8 suitably being permanented by means of some glue or the like. The bolt shaft 9 is suitably arranged coaxially with the locking pin 7 and the locking pin 7 and the axis B of the bolt shaft 9 are displaced relative to the axis A of the head 1 when the locking pin 7 is inserted in the fitting 6 in the corner casting 4.

The section according to FIG. 2 illustrates the mutual location of the axes A,B when the locking head 1 is aligned with the opening 3. The dashed line indicated by 45, illustrates the minimum demands on the extension of the hole 11 if the locking head 1 shall be turnable 45° relative to the corner casting from the position shown in FIG. 2. As there always is a certain tolerance with reference to the position of the hole 12 in the fitting 6 and the position of the fitting 6 relative to the corner casting 4, it is, however, suitable to design the hole 11 larger than the theoretical minimum demand, and for manufacturing reasons it is suitable to design the hole 11 as a bore which then is adapted to the freedom of movement which the bolt shaft 9 must have relative to the locking head 1.

The locking head 1 has a shoulder 18 against which the end of pin 7 may abut. The length of the bolt shaft 9 between the end of pin 7 and the washer 10 is preferably somewhat larger than the length of the hole 11 in order to permit a parallel displacement of the pin 7 with reference to the head axis A without any significant friction. However, hereby a certain small angular displacement of the pin 7 relative to the axis A is permitted, but such angular displacement is relatively small and does harmfully affect the introduction of the pin 7 into the bore 12 of the fitting 6. The forward end the locking pin 7 is suitably taperred in order to simplify introduction of the pin 7 into the hole 12.

FIG. 3 illustrates two containers 5, 5' stacked onto each other, the corner castings 4 and 4' respectively thereof being connected by means of a fitting 6 which is illustrated by dashed lines. The locking head 1 of the lashing rod is inserted in the opening 3 of the corner casting 4 and has then been pivoted about 45° such that the protruding portions of the head 1 straddles the corner casting wall wherein the opening 3 is arranged, and furthermore the locking pin 7 is inserted in the fitting 6. The other end of the lashing rod 2 is provided wth an eye 29 to which a tensioner 30 is connected. The tensioner 30 is by means of a hook 31 connected to the eye 29, and is by means of a hook 33 hooked into an opening in a base 32 such as a deck of a ship. The lashing rod 2 may have a total length of about 2.5 meters.

It is appreciated that the inventive design of the locking head 1 of the lashing rod 2 in far reaching extent simplifies mounting and demounting of the lashing.

What is claimed is:

1. In a lashing rod (2) having a locking head (1) for connection to a corner casting (4) of a container (5) through a side access opening (3) in such corner casting (4), the locking head (1) being pivotable in the side access opening about a pivot axis whereby a locking stud (26) on the locking head (1) engages behind the edge of the side access opening, the corner casting (4) having a bottom access opening through which a fitting extends into the cavity of the corner casting, the fitting having a horizontal bore (12) with a bore axis, the bore axis being arranged eccentrically relative to the pivot axis (A) of the locking head (1) in the side access opening (3), the improvement comprising a locking pin (7) connected to the locking head (1), the locking pin having an axis substantially parallel with the locking head pivot axis (A), the locking pin being arranged parallel displaceable relative to the locking head pivot axis (A), whereby the locking pin is insertable into the bore (12) of the fitting by means of the lashing rod, and the lashing rod (2) is pivotable for connection of the locking head (1) to the corner casting (4) without interference by the locking pin (7).

2. A lashing rod as set forth in claim 1 wherein the locking head (1) has a hole (11) extending through the locking head, said hole having an axis parallel with the locking head pivot axis (A), the locking pin (7) having a shaft (9) extending through the hole (11), the shaft being mounted form-closed at the locking head (1) against axial movement, and there being sufficient clearance between shaft (9) and hole (11) so that the locking head (1) is pivotable a predetermined angle in the side access opening (3) of the corner casting (4) without interference by the shaft (9) of the locking pin (7) inserted in the fitting (6).

3. An improved lashing rod of the type comprising a lashing rod head having an elongated stud adapted for passing through a first access opening of a container corner casting and for engaging an inner wall of such container corner casting upon rotation of the lashing rod about a pivotal axis so that the rod head is secured to the corner casting, the corner casting having a second access opening for receiving a fitting adapted for interlocking adjacent containers by means of a locking pin passing through a receiving bore in the fitting, the improvement comprising:
   a locking pin secured to the rod head having a locking pin axis substantially parallel to the pivotal axis, the locking pin adapted for insertion into the receiving bore upon passage of the stud through the first access opening so that the rod head is rotatable for securing the rod head to the corner casting while the pin is inserted in the bore.

4. The improved lashing rod of claim 3 wherein the lashing rod includes means for anchoring the lashing rod to an anchoring deck and the locking pin is adapted for confined movement, with respect to the pivotal axis, while said pin remains substantially parallel to the pivotal axis and without translation of the pin along the locking pin axis.

5. The improved lashing rod of claim 4 wherein the lashing rod head has a passageway having a passageway axis, the passageway axis being parallel to the pivotal axis and means extending through the passageway for securing the locking pin to the lashing rod head while permitting confined movement of the locking pin with respect to the pivotal axis.

6. The improved lashing rod of claim 5 wherein the pin is substantially cylindrical, the passageway is cylindrical and the means for securing the locking pin to the lashing rod head comprises a bolt having a head portion and a shaft portion, the shaft portion extending through the passageway, the head portion having a diameter greater than the diameter of the passageway, the shaft portion coupled at the end thereof to the locking pin, the diameter of the pin being greater than the diameter of the passageway, the diameter of the shaft portion being smaller than the diameter of the passageway for providing confined movement of the locking pin with respect to the pivotal axis.

7. The improved lashing rod of claim 4 wherein the rod head is located at one end of the lashing rod and the anchoring means includes an eye-ring located at the other end of the lashing rod.

8. The improved lashing rod of claim 7 wherein the anchoring means further includes tensioning means coupled between the eye-ring and the anchoring deck for placing and maintaining the lashing rod in a taut condition.

* * * * *